US010272612B2

(12) United States Patent
Tabanelli

(10) Patent No.: US 10,272,612 B2
(45) Date of Patent: Apr. 30, 2019

(54) STATION FOR HEATING PIPES MADE OF THERMOPLASTIC MATERIAL

(71) Applicant: SICA S.p.A., Alfonsine (IT)

(72) Inventor: Giorgio Tabanelli, Cotignola (IT)

(73) Assignee: SICA S.P.A., Alfonsine (Ravenna) (IT)

( * ) Notice: Subject to any disclaimer, the term of this patent is extended or adjusted under 35 U.S.C. 154(b) by 286 days.

(21) Appl. No.: 15/305,267

(22) PCT Filed: Apr. 16, 2015

(86) PCT No.: PCT/IB2015/052793
§ 371 (c)(1),
(2) Date: Oct. 19, 2016

(87) PCT Pub. No.: WO2015/162531
PCT Pub. Date: Oct. 29, 2015

(65) Prior Publication Data
US 2017/0043522 A1 Feb. 16, 2017

(30) Foreign Application Priority Data

Apr. 22, 2014 (IT) .............................. BO2014A0229

(51) Int. Cl.
*B29C 57/04* (2006.01)
*B29B 13/02* (2006.01)
*B29L 23/00* (2006.01)

(52) U.S. Cl.
CPC .......... *B29C 57/045* (2013.01); *B29B 13/025* (2013.01); *B29C 57/04* (2013.01); *B29L 2023/22* (2013.01)

(58) Field of Classification Search
CPC .................................................. B29L 2023/22
See application file for complete search history.

(56) References Cited

U.S. PATENT DOCUMENTS

| 4,490,130 A * | 12/1984 | Konzal ................. B29B 13/025 493/106 |
| 5,879,723 A * | 3/1999 | Stachowiak .......... B29B 13/025 264/320 |
| 2010/0123272 A1 * | 5/2010 | Tabanelli .............. B29B 13/025 264/322 |

FOREIGN PATENT DOCUMENTS

| DE | 10058505 A1 | 6/2002 |
| EP | 0700771 A1 | 3/1996 |
| IT | 1171936 | 6/1987 |
| WO | WO2009074999 A2 | 6/2009 |

OTHER PUBLICATIONS

International Search Report and Written Opinion dated Sep. 28, 2015 for counterpart PCT Application No. PCT/IB2015/052793.

* cited by examiner

*Primary Examiner* — Joseph A Miller, Jr.
(74) *Attorney, Agent, or Firm* — Shuttleworth & Ingersoll, PLC; Timothy J. Klima

(57) ABSTRACT

Described is a station for heating a plurality of end portions of pipes made of thermoplastic material, comprising a plurality of heating elements equipped with short wave radiation units, a plurality of housings alongside each other and lying aligned on a horizontal plane, each housing being designed to accommodate a respective pipe and comprising at least one external heating element and at least one internal heating element.

15 Claims, 4 Drawing Sheets

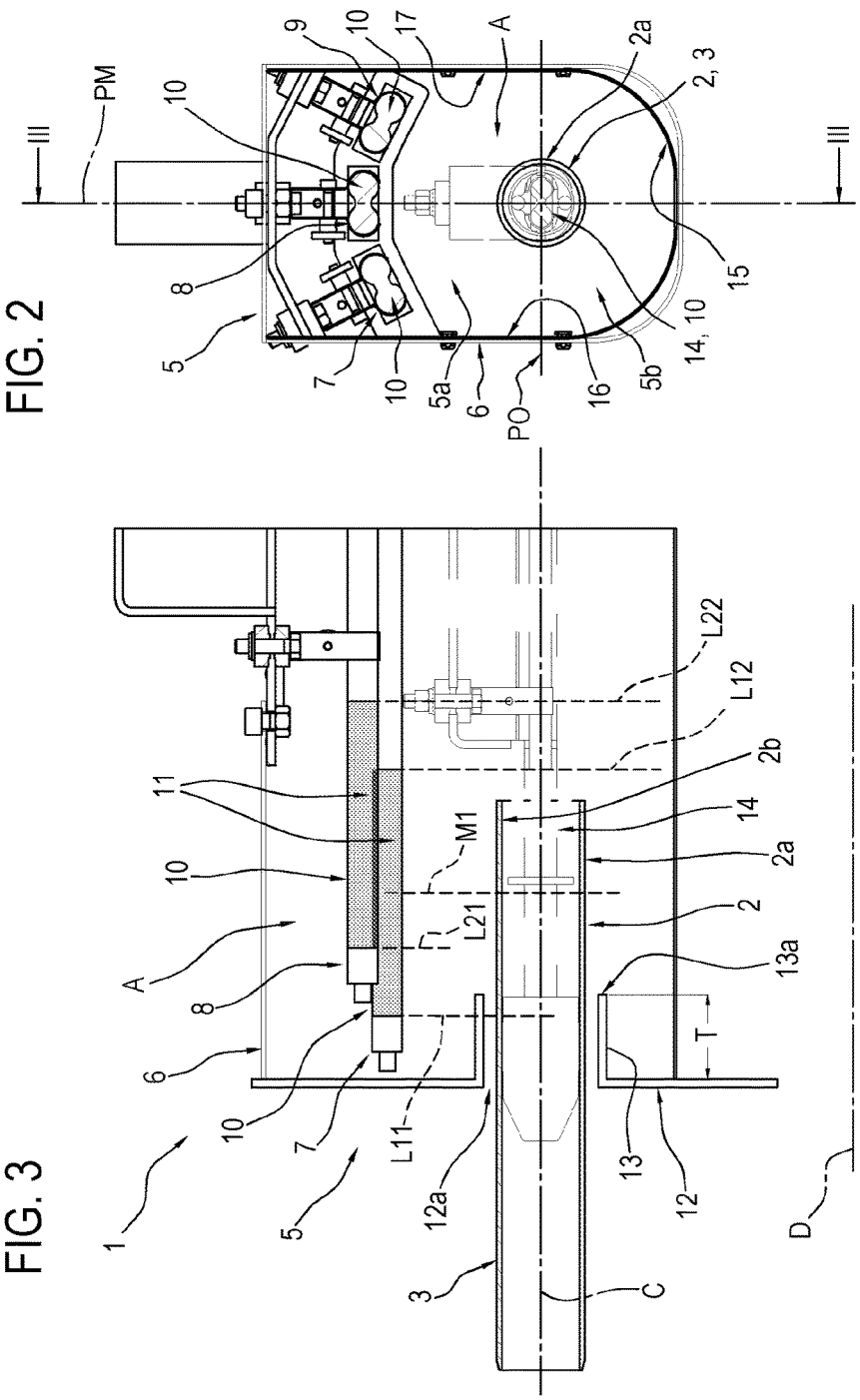

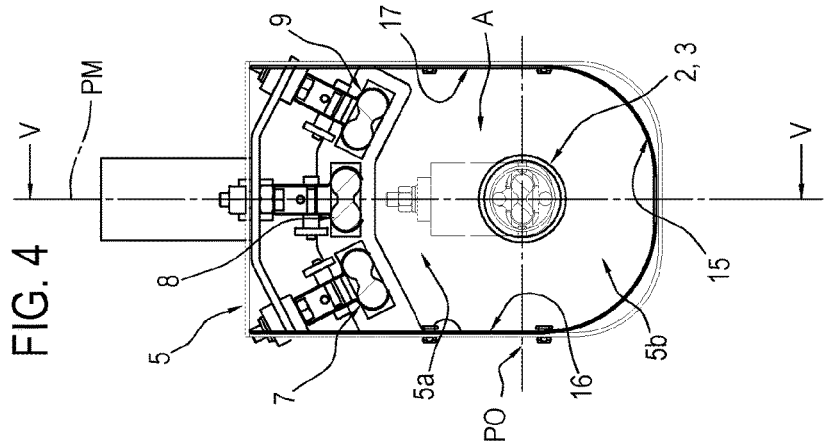
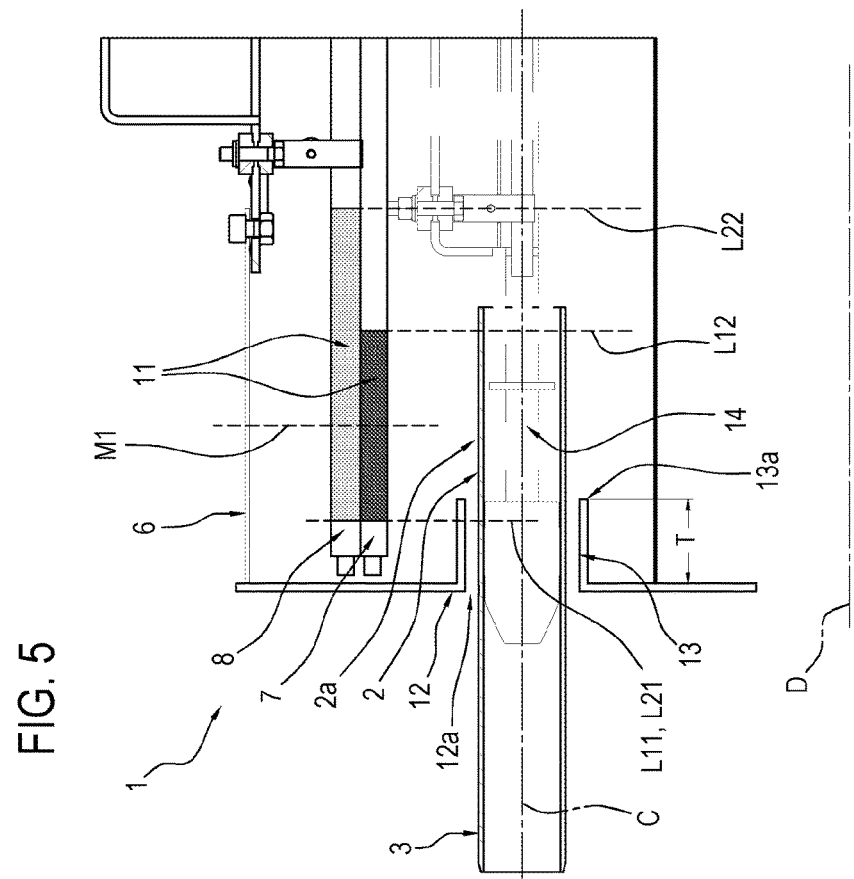

STATION FOR HEATING PIPES MADE OF THERMOPLASTIC MATERIAL

This application is the National Phase of International Application PCT/IB2015/052793 filed Apr. 16, 2015 which designated the U.S.

This application claims priority to Italian Patent Application No. BO2014A000229 filed Apr. 22, 2014, which application is incorporated by reference herein.

TECHNICAL FIELD

This invention relates to a station for heating pipes made of thermoplastic material.

More specifically, this invention relates to a station for heating ends of pipes made of thermoplastic material to subject the ends to a subsequent hot plastic deformation process.

BACKGROUND ART

The heating station is especially suitable for performing the step of heating the end of the pipe in the belling process. In effect, in the production of pipes by thermoplastic extrusion designed for making conduits for delivering and/or discharging fluids (used for example in the drainage networks, drinking water distribution networks and sewers of building works), the belling machines are used for forming an end portion of the pipes into the characteristic "bell" shape. This particular wider shape is used to connect the pipes in succession which form a conduit. An unshaped end of a pipe is normally inserted in the bell-shaped end of the adjacent pipe in the conduit.

The invention also relates to a belling machine for forming multiple bells on pipes made of thermoplastic material.

The belling machine is normally installed along the extrusion line where it receives the cut pipes to be processed.

The majority of belling machines make the bell with the hot forming process. The belling machines are equipped with one or more heating stations to heat the end of the pipe, changing the wall to be shaped into a plastically deformable softened state. The machine is further equipped with forming equipment which, by using a suitable mould, forms the heated end of the pipe into a bell shape. The bell shaped on the mould is generally cooled inside the same forming equipment.

The most commonly used thermoplastic materials in pipe systems are unplasticised polyvinyl chloride (PVC-U), polypropylene (PP) and high-density polyethylene (HDPE).

The state of optimum plastic deformability and therefore the final thermal state of the pipe before the belling process depends on the material, the shape of the bell, the wall thickness of the pipe, the dimensions specified for the bell and the characteristics of the forming and/or cooling method.

The PVC-U thermoplastic material is a substantially amorphous material which at ambient temperature exhibits a fragile mechanical behaviour similar to glass whilst at temperatures greater than 75° C.-80° C. (vitreous transition temperature Tg) it starts to soften, exhibiting a plastic rubbery behaviour. Normally, with the PVC-U pipe the belling step allows a relatively large optimum thermal heat state range.

The optimum temperatures for a PVC-U pipe belling process are approximately between 90° C. and 125° C. and it is not necessary for temperature to be uniform either along the axis of the pipe or in the thickness, thereby allowing not particularly sophisticated technical solutions, and therefore also less expensive, for heating pipes made of that material.

Much more complex heating and belling techniques are, however, required for pipes made of the other thermoplastic materials mentioned above, that is, polypropylene (PP) and high-density polyethylene (HDPE).

Polypropylene (PP) and high-density polyethylene (HDPE) at ambient temperature are, in effect, semi-crystalline, that is to say, there coexists in them an ordered macromolecular crystalline configuration and a disordered amorphous macromolecular configuration.

At ambient temperature the amorphous part is in a viscous liquid state, so the ambient temperature is greater than the vitreous transition temperature of the amorphous part of the material.

At ambient temperature, PP and HDPE exhibit a ductile and tough mechanical behaviour.

Unlike PVC-U, both PP and HDPE have a melting temperature, that is to say, a temperature above which there is a destruction of the crystalline mesh and the change of state from solid to liquid. The melting temperature of polypropylene (PP) is approximately 165° C., whilst that of high-density polyethylene (HDPE) is approximately 134° C.

The change from the solid state to the liquid state is therefore quite sudden and occurs in a very small temperature range equal to approximately ±1° C. relative to the melting temperature.

At temperatures higher than melting temperature the process of forming the bell in the hot state cannot be performed. For this reason, the optimum thermal state for the belling of PP and HDPE pipes is certainly less than the melting temperature.

Consequently, the shaping of the bell in PP and HDPE pipes occurs with material which exhibits a viscoelastic and viscoplastic mechanical behaviour, so, unlike PVC-U pipes, the elastic behaviour of the material in the mechanical shaping deformation is not negligible. With temperatures which are too low the plastic deformability of the material can be insufficient to form the shape of the bell, or, even if it can be formed, the resulting bell is subject to shrinkage phenomena due to the memory of the initial dimensions of the pipe, the shrinkage effects increasing the greater is the elastic part of the deformation made during the forming step.

For this reason, in the belling process for PP and HDPE pipes, variations are permitted in the hot working temperature which fall within a very small range, approximately ±2° C. around the predetermined optimum value.

Therefore, compared with PVC-U pipes, the most common belling processes applied to PP and HDPE pipes require a temperature distribution along the axis of the pipe and in the thickness of the wall which is almost uniform, as with different temperatures in various zones of the pipe there would be a different behaviour with the shrinkage of the various zones of the bell and, as a direct consequence, an unacceptable distortion in shape and a dimensional instability of the bell itself.

In order to limit at least partly the occurrence of these unwanted circumstances, contact heating ovens are widely applied in the belling machines for PP and HDPE pipes. The contact ovens are substantially configured with metallic masses which adhere to the surface of the end of the pipe. The metallic masses are maintained at a precise temperature and transfer the heat to the wall of the pipe by conduction. Normally, the contact oven is configured with shells which enclose the outside of the wall of the pipe. A spindle which heats by contact or a device which operates with a different heat transmission system is inserted inside the pipe in the same oven.

Whilst it is relatively simple to heat the outer surface of the pipe, it is much more complex to achieve a heating by contact of the inner surface. In effect, due to the features of the pipe extrusion process, the wall thickness and, therefore, the inside diameter of the pipe is never as regular as the outside diameter; it follows that the internal heating element can if anything be close the inner wall, but not adhere to the surface. Moreover, the reduced space available inside the small diameter pipes (the commercial diameters currently start from 32 mm) makes it complex and costly to make an efficient internal heating system.

For these reasons it is normally preferred to heat the pipe mainly by external contact, adopting solutions for the internal heating that make the heating process faster and such as not create thermal discontinuities in the wall of the pipe.

For example, the internal heating is performed with systems which mainly heat by radiation with the use of measures, typically rotary devices, such as to render the heating uniform in the circumference of the pipe.

The heating which occurs mainly by external contact, with transmission of heat by conduction, is in any case a slow heating process.

In the belling machines for PP and HDPE pipes such as those described in patent documents IT 1 171 936 and EP 700 771, the time necessary for forming and cooling the bell are considerably shorter than the times required for heating the end of the pipe prior to shaping.

Purely by way of example, to form the bell in a common PP pipe for drains of buildings (outside diameter 110 mm, wall thickness 2.7 mm) a forming-cooling time of approximately 15 seconds is required, whilst the heating with contact systems makes the pipe formable in a time of not less than 45 seconds.

For this reason, the prior art belling machines for PP and HDPE pipes are normally configured with a single forming-cooling station associated with a plurality of heating stations, at least two but normally three or four.

Therefore, the cut pipe coming from the extrusion line is heated, at the end to be formed into a bell shape, in the various heating stations, before being inserted in the single forming and cooling station.

The need to produce short pipes and at the same time maintain high extrusion speeds results in the need for high production belling machines; for this reason the systems for belling drain pipes for buildings are suitably configured to operate in a multi-belling mode.

The belling machine which operates in multi-belling mode accumulates the cut pipes arriving from the extrusion line in a group of several pipes; the group is then moved into the various work stations of the machine with the pipes arranged side by side on a horizontal plane.

Purely by way of an example, the belling machine may be configured to simultaneously process 4 pipes with diameters of 32 mm, 40 mm and 50 mm or three pipes with diameters of 63 mm and 75 mm or two pipes with diameters of 90 mm and 110 mm.

It may be understood that the simultaneous heating of several pipes in the same contact heating oven makes the belling machine even more complex and costly, especially when it is also configured with several successive heating stations.

Belling machines for PVC-U pipes do not have these problems even when they are designed to process drain pipes for buildings. In effect, it has been found that a precise heating is not required for PVC-U pipes, unlike for PP and HDPE pipes and, therefore, hot air ovens or ovens with radiation heating elements can be conveniently used which are able to heat in an optimum manner, the PVC-U pipes, in much shorter times than that which can be achieved with contact ovens.

For example, belling machines for PVC-U pipes configured with a single heating station equipped with a hot air oven, even in multi-belling mode, are able to support the same productivity as belling machines configured with three or four contact stations. The hot air or radiation ovens are also usually less complex and expensive than contact ovens for multi-belling.

In effect, these belling machines for multi-belling configured with radiation or hot air ovens can only be used for PVC-U pipes, where, on the contrary, the greatest demand for drain pipes for buildings is currently for PP and HDPE pipes.

To overcome these limitations, at least partly, "hybrid" machines are made where the first heating station is of the hot air or radiation type, whilst the second and last station is of the contact type. In this way, a fast, but imprecise, pre-heating is achieved with the first station, whilst the second and last contact station completes the heating bringing the end of the pipe to the precise and uniform heating necessary for PP and HDPE pipes.

Amongst the radiant ovens used in belling machines, the so-called short wave radiant ovens are important, such as that described in patent document DE10058505, as it makes it possible to obtain reduced, and therefore advantageous, heating times. This device basically comprises a container limited by metallic walls open at the side where the end of the pipe to be heated enters. The inside of the container houses several electrically powered heating elements.

The apparatus is equipped with heating elements, so-called radiation units, which transfer electromagnetic energy in the form of infra-red rays, the radiation emitted mainly in the short wave range (0.9 μm-1.6 μm). Compared with the more common long and medium wave radiation units, used in the belling machines for PVC-U pipes, the short wave radiation units have a greater penetration capacity.

In this description, reference is made without distinction to radiation devices or radiation units.

The short wave radiation units, commonly known also as infra-red lamps, are rectilinear tubes made of quartz glass, inside of which a tungsten wire is located which reaches temperatures in the order of 2000° C. These lamps have very short starting times, of less than two seconds, a feature which makes it possible to keep the radiation units de-energised during the phases in which the pipe is not present in the oven, with obvious energy savings.

In the short wave radiation ovens a certain number of lamps are positioned parallel to the axis of the pipe.

Since the distribution of the radiation is not uniform around the pipe in the oven, the pipe is maintained in constant rotation during the heating step in order to obtain a uniform heating along the circumference.

With a focussed positioning and selection of the radiation units, in terms of number and power, it is possible to obtain very short heating times providing the radiation units are installed both outside and inside the pipe.

The two-sided heating is also necessary to obtain the maximum uniformity of temperature in the thickness of the wall.

However, in the belling of PP and HDPE pipes a uniform heating is also necessary along the axis of the pipe and the configuration of the oven described above does not favour this type of heating. In effect, given the laws of the transmission of heat by radiation, a pipe exposed to a radiation unit positioned parallel to its axis is heated more in the zone which faces the central part of the emitter, since this pipe zone is overall closest to the heating system; with the heating reducing in the zones of the pipe which face the ends of the heating element.

With regard to multi-belling operations, a short wave radiant oven can simultaneously heat in the same way two pipes if they are arranged symmetrically relative to the heating elements of the outer side, and if each pipe is heated on the inner side by radiation units having the same configuration.

For groups of three or more pipes it is difficult to achieve a heating which is equal for all the pipes since the pipes are lying in a horizontal plane and the conditions for heating the pipes located at the sides are without doubt different from those of the pipes in an inside position. In effect, in the case of three or more pipes located side by side, they interact in the heating phase and the effects of the various heating elements on each pipe will also be influenced by the presence of the adjacent pipes, which absorb part of the heat emitted, at the same time screening the heat towards the nearby pipes.

Since, however, in the multi-belling the equal heating of the pipes is an essential condition, with the oven configuration with short wave radiation units as described above the multi-belling is necessarily limited to the double belling.

This circumstance constitutes an obvious limitation to the increase in productivity of belling machines in multi-belling mode.

DISCLOSURE OF THE INVENTION

The aim of this invention is therefore to overcome the disadvantages of the prior art by providing a heating station equipped with short wave radiation units which are able to heat equally and simultaneously more than two pipes.

A further aim of this invention is to propose a heating station equipped with short wave radiation units which are functional, effective and practical to use.

According to the invention, these aims are achieved by a heating station comprising technical features as disclosed herein.

BRIEF DESCRIPTION OF DRAWINGS

The technical features of the invention, according to the above aims, are clearly disclosed herein and its advantages are apparent from the detailed description which follows, with reference to the accompanying drawings which illustrate non-limiting example embodiments of it, and in which:

FIG. 2 is a schematic front view of a detail of the station of FIG. 1;

FIG. 3 is a cross section view through the line III-Ill of FIG. 2;

FIG. 4 is a schematic front view a variant embodiment of the detail of FIG. 2;

FIG. 5 is a cross section view through the line V-V of FIG. 4;

DETAILED DESCRIPTION OF PREFERRED EMBODIMENTS OF THE INVENTION

Figure 1:
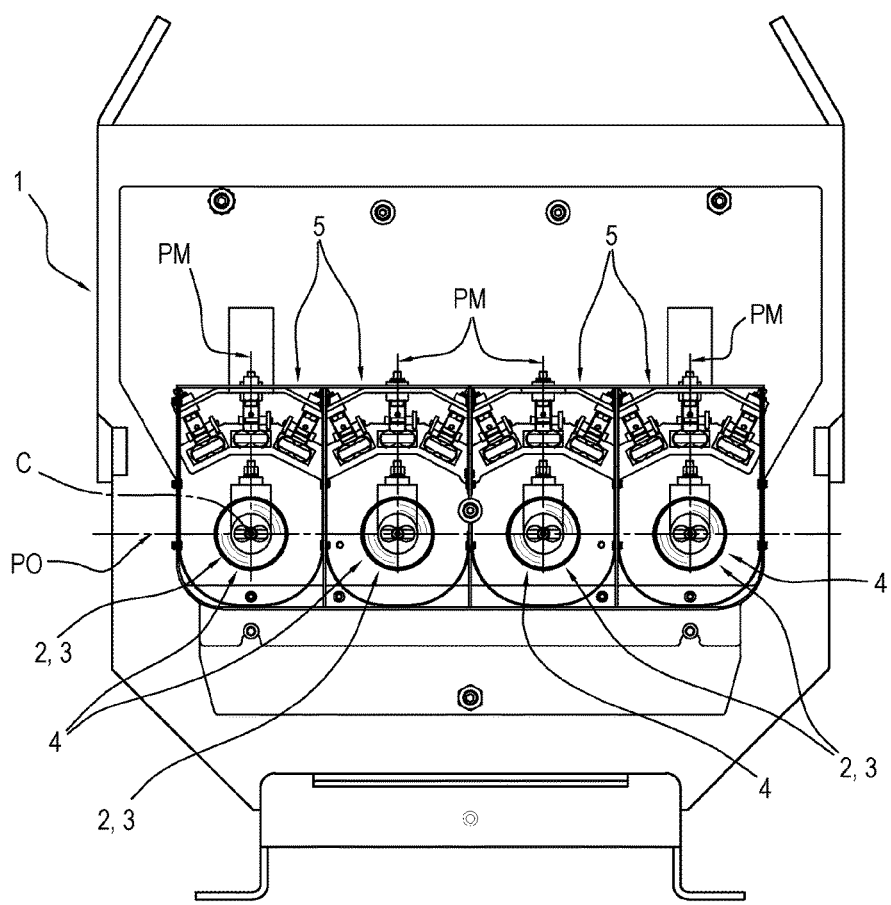
FIG. 1 is a schematic front elevation view, with some parts cut away to better illustrate others, of a heating station made according to this invention.

As illustrated in FIG. 1, the numeral 1 denotes in its entirety a first embodiment of the heating station according to this invention.

The station 1 is designed to carry out, with the method described below, the simultaneous heating of a plurality of end portions 2 of pipes 3 made of thermoplastic material, introduced inside it.

Mainly, but not exclusively, the station 1 according to this invention is used for heating pipes 3 made of polypropylene (PP) and made of high-density polyethylene (HDPE).

The end portion 2 of the pipe 3 is heated for being subjected to a thermoforming step, such as the forming of an end bell, not illustrated.

With reference to FIG. 1, the heating station 1 comprises four housings 4 each of which is designed to house a respective pipe 3 (or rather, a relative end 2) to be heated.

The housings 4 are side by side and lie on a horizontal plane PO parallel to the plane containing the central axes C of the pipes 3 being heated.

In the embodiment illustrated in FIG. 1 each housing 4 is contained inside a respective cell 5. The station 1 of FIG. 1 therefore has four separate cells 5, each comprising inside it a respective housing 4.

As shown in FIG. 2, which illustrates in detail one of the cells 5 of FIG. 1, each cell 5 comprises a containment casing 6 inside of which is defined the above-mentioned housing 4 and an area A for heating the end portion 2 of the pipe 3.

Each cell 5 has a relative median plane PM the line of which is shown in FIG. 2 by line III-III.

The median plane PM is perpendicular to the horizontal plane PO of alignment of the various cells 5.

Inside the casing 6, the cell 5 has a plurality of heating elements 7, 8, 9 designed to operate by radiation on an outer cylindrical surface 2a of the portion 2 of the pipe 3, also indicated as external heating elements.

The external heating elements 7, 8, 9 are designed for heating the outer cylindrical surface 2a of the end portion 2 and, for that purpose, comprise infra-red ray radiation units 10.

The infra-red ray radiation unit 10 is advantageously of the filament type and has an operating zone 11 extending longitudinally along a predetermined direction D and facing the above-mentioned outer cylindrical surface 2a of the end portion 2.

The casing 6 of the cell 5 also comprises a front wall 12 on which is defined an opening 12a for access of the pipe 3 to the housing 4.

Near the access opening 12a, the front wall 12 has a cylindrical portion 13 projecting inwards, that is, towards the above-mentioned heating area A.

The cylindrical portion 13 of the wall 12 comprises a cylindrical screening surface, designed to prevent the heating of the pipe 3—by the external heating elements 7, 8, 9—outside the desired end portion 2.

In other words, the portion of the pipe 3 which protrudes from an edge 13a of the cylindrical portion 13 towards the heating area A constitutes, with the relative length T, precisely the end portion 2 to be heated.

Again with reference to FIG. 2, the cell 5 also comprises an internal heating element 14 on which is fitted, externally, the pipe 3, at least for a stretch equal to the above-mentioned end portion 2 to be heated.

In short, the internal heating element 14, together with its supporting elements not described, defines the above-mentioned housing 4 of the pipe 3.

The internal heating element 14 is designed to heat an inner cylindrical surface 2b of the end portion 2 and, for this purpose, comprises a respective infra-red ray radiation unit 10, shown with a dashed line in FIGS. 3, 5.

When the end portion 2 is fitted on the internal heating element 14, the above-mentioned predetermined direction D is parallel to a central axis C of the pipe 3 to be heated.

The heating station 1 also comprises rotation means, not illustrated and of a substantially known type, for rotating the pipe 3 with the respective end portion fitted on the internal heating element 14, relative to the radiation unit 10, about the central axis C of the pipe 3.

The purpose of this rotation is to render uniform in a circumferential direction the heating of both the inner 2a and outer 2b surfaces of the end portion 2 of the pipe 3 operated by the internal 14 and external 7, 8, 9 heating elements, respectively.

As illustrated in FIGS. 2 and 4, the cell 5 comprises, inside the casing 6, a reflective surface 15 designed to face the portion 2 of the pipe 3, striking a significant portion of the angular extension of the outer cylindrical surface 2a.

Again with reference to FIGS. 2 and 4, the angular extension is greater than 180° indicating that more than half of the outer cylindrical surface 2a of the portion 2 of the pipe 3 (more specifically the lower half) is struck by the rays reflected from the surface 15.

The reflective surface 15 has a curved extension with a curvature the same as that of the cylindrical outer surface 2a of the pipe 3 being heated.

Each cell 5 also has two lateral reflective walls 16, 17, positioned symmetrically on opposite sides of the above-mentioned median plane PM.

The reflective surface 15 with a curved extension is connected with the two above-mentioned lateral reflective walls 16, 17.

As illustrated in FIGS. 2 and 3, the external heating elements 7, 8, 9 are grouped together in two separate groups: a first group which comprises the elements 7, 9 (lateral in FIG. 2) and a second group which comprises the single element 8 (central in the figure).

Experiments have shown that an optimum result in terms of uniformity of heating in a longitudinal direction of the end portion 2, at least with reference to the heating by the external heating elements 7, 8, 9, is obtained with well defined longitudinal extensions (that is, along the direction D) of the operating zones 11 of the radiation units 10 of the two above-mentioned groups as well as these operating zones 11 being longitudinally offset from each other.

A relationship has therefore been identified which defines these extensions, a relationship by which, with reference to FIG. 3, the operating zone 11 of the radiation unit 10 of the first of group (elements 7, 9) extends longitudinally along the predetermined direction D from a first limit L11 along the predetermined stretch T of extension of the cylindrical screening surface 13 to a second limit L12 such that the centre line M1 of the operating zone 11 falls within the portion 2 of pipe 3 to be heated; the operating zone 11 of the radiation unit 10 of the second group (element 8) extends from a first limit L21 along a first half of the operating zone 11 of the radiation unit (or units) 10 of the first group to a second limit L22 outside the end portion 2 of the pipe 3 and which also passes beyond, away from the pipe 3, the second limit L12 of the operating zone 11 of the radiation unit 10 of the first group.

The alternative positioning of the first and second groups illustrated in FIG. 5 represents a particular case of the relationship just described wherein the first limit L11 and the first limit L12, for, respectively, the first and second groups of external heating elements, appear substantially coincident.

With reference to FIG. 1, each cell 5 has an upper zone 5a and a lower zone 5b located on opposite sides of the horizontal plane PO.

In the preferred embodiments illustrated in the accompanying drawings, the station 1 has cells 5 wherein the external heating elements 7, 8, 9 are positioned in the upper zone 5a and the reflective surface 15 with a curved extension is in the lower zone 5b.

In other words, in more general terms, the external heating elements 7, 8, 9 and the reflective surface 15 with a curved extension are located on opposite sides of the horizontal plane PO.

Figure 6:
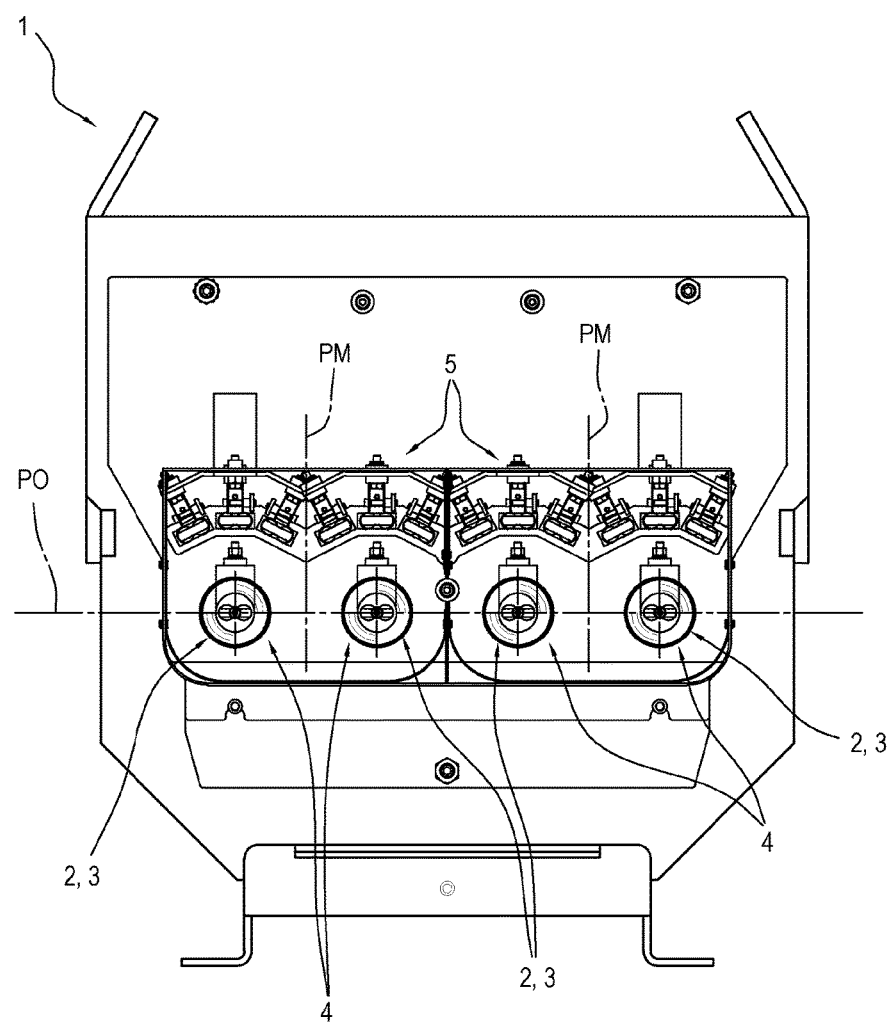
FIG. 6 is a schematic front elevation view, with some parts cut away to better illustrate others, of another embodiment of the heating station of FIG. 1.

In the variant embodiment illustrated in FIG. 6, the heating station 1 comprises cells 5 each having two housings 4.

In the cell 5 of FIG. 6 the median plane PM divides the cell into two symmetrical parts each having a respective housing 4.

With reference to the heating station 1 in its various embodiments shown in the accompanying drawings, the housings 4 of the pipes 3 being heated are grouped together in a plurality of cells 5 with each cell 5 comprising at the most two housings 4.

This limitation in the number of housings 4 allows, in effect, the radiation units 10 of the external heating elements 7, 8, 9 to be positioned in an optimum manner, thus effectively controlling the heating of several pipes 3 so as to make it uniform.

Advantageously, this substantially eliminates, in the heating of a pipe 3, the effects and the influences of the adjacent pipes 3 in the heating stations for multi-belling of known type.

That situation, as mentioned, often occurs in multi-belling machines during the multi-belling of known type and the consequences of this situation (basically an unequal heating between the various pipes and also along the end portion of a same pipe) are particularly harmful in the process of belling PP or HDPE pipes where, on the contrary, as often explained, the optimum temperature range is particularly limited.

This invention overcomes the drawbacks of the prior art machines with a station 1 having a plurality of cells 5 and an offset position of the radiation units 10 of the two groups in which the external heating elements 7, 8, 9 are grouped together. This arrangement achieves a uniform heating of the end portion 2 along the direction of the axis C of the pipe 3.

The presence of the cylindrical screening surface 13 which is designed to shield the pipe 3 from the heating close to the opening 12a for access to the heating area A also contributes towards this uniform distribution.

Further, the station 1 according to this invention has a symmetrical configuration of the external heating elements 7, 8, 9 relative to the median plane PM of the cell 5, this arrangement contributing towards a uniform and optimum heating of the pipes 3.

As mentioned, the infra-red ray radiation unit 10 is advantageously of the filament type.

Preferably, the radiation units 10 are infra-red lamps of the so-called twin type, that is to say, configured with radiation filament with ends located at the same end of the lamp body. The filament is single but is in the form of pair of heating elements close to one another and parallel to each other. This configuration is advantageous since it allows the longitudinal dimensions of the device to be reduced, and also allows the length of the part of the pipe 3 which must enter inside the cell 5 without being heated to be reduced.

The heating station 1 described above is advantageously integrated, as mentioned, in a belling machine, not illustrated, for multi-belling of pipes 3 made of thermoplastic material, to simultaneously form bells at the ends 2 of a plurality of pipes 3.

The machine not illustrated comprises a line for feeding pipes 3 to be belled and a station 1 for heating the ends of the pipes 3.

The feed line picks up, in a substantially known manner, pieces of pipe (conveniently cut from a continuous pipe made with the extrusion process) for feeding them to the heating station 1.

The heating station 1 is made according to this invention and is designed to heat, simultaneously and without the need for further heating steps to be performed in other parts of the machine, the end portions 2 of the pipes 3, thereby preparing them for a subsequent belling step.

To implement the belling step, the above-mentioned machine not illustrated, comprises a station for forming bells on the ends 2 of the pipes 3, the station comprising a plurality of forming spindles for performing multi-belling operations.

This invention also relates to a method for heating the end portions 2 of pipes 3 made of thermoplastic material, the method comprising a first step of preparing a plurality of pipes 3 made of thermoplastic material, the plurality consisting in a number of pipes 3 greater than two.

Subsequent steps are to feed the pipes 3 (whose number is greater than three) to a heating station 1 and, in that station 1, heating them simultaneously, at their longitudinal ends 2. This heating comprises changing the pipes 3 from a first predetermined temperature at which they find themselves at the end of the step for feeding the pipes 3 when the enter in the station 1, to a second predetermined deformation temperature at which the pipes 3 are subjected to forming.

After reaching the predetermined thermal state of their end portions 2, the method comprises the further step of forming a bell at the heated end 2.

The step of simultaneously heating all the pipes 3 to be formed occurs in a single heating station 1 made in accordance with this invention.

The invention claimed is:

1. A station for heating a plurality of portions of ends of pipes made of thermoplastic material, comprising:
    a plurality of heating elements including short wave radiation units,
    a plurality of housings alongside each other and lying aligned on a horizontal plane, each housing of the plurality of housings shaped to accommodate a respective pipe and comprising at least one external heating element and at least one internal heating element, wherein the plurality of housings are grouped together in a plurality of cells, with each cell of the plurality of cells comprising at most two of the plurality of housings and at least two groups of external heating elements, each group of the at least two groups comprising at least one heating element, the at least two groups being spaced at least partly offset along a predetermined direction parallel to a central axis of the respective pipe being heated in the cell;
    wherein each of the short wave radiation units has a relative operating zone extending longitudinally along the predetermined direction, and wherein each of the plurality of housings includes a cylindrical screening surface extending coaxially to the respective pipe being heated for a predetermined stretch, the cylindrical screening surface including an edge defining an extension of an end portion of the respective pipe being heated, wherein the relative operating zone of a first group of the at least two groups extends longitudinally along the predetermined direction from a first limit within the predetermined stretch to a second limit such that a center line of the relative operating zone falls in a portion of pipe to be heated; wherein the relative operating zone of a second group of the at least two groups extends from a third limit within a first half of the relative operating zone of the first group to a fourth limit outside an end of the portion of pipe to be heated and which passes beyond, away from the respective pipe, the second limit.

2. The station according to claim 1, wherein each cell comprises a reflective surface arranged to face the respective pipe for at least half an angular extension of an outer cylindrical surface of the respective pipe.

3. The station according to claim 2, wherein the reflective surface includes a curved extension with a curvature corresponding to a curvature of the outer cylindrical surface.

4. The station according to claim 3, wherein each cell includes an upper zone and a lower zone on opposite sides of the horizontal plane, wherein the at least one external heating element is located in one of the upper and lower zones and the curved extension is positioned at the other of the upper and lower zones.

5. The station according to claim 4, wherein the curved extension is positioned at the lower zone.

6. The station according to claim 3, wherein each cell includes two lateral reflective walls positioned symmetrically on opposite sides of a median plane of each cell, wherein the curved extension is connected to the two lateral walls.

7. The station according to claim 1, wherein the short wave radiation units of the at least one external heating element of each cell are positioned symmetrically relative to a median plane of each cell perpendicular to the horizontal plane and parallel to the central axis of the respective pipe being heated in the cell.

8. A belling machine for multi-belling of pipes made of thermoplastic material, to simultaneously form bells on respective ends of a plurality of tubes, comprising:
    a line for feeding pipes on which bells are to be formed,
    a heating station according to claim 1 for simultaneously heating a plurality of the pipes,
    a forming station for forming bells on the ends of the pipes, the forming station comprising a plurality of forming spindles.

9. A method for heating portions of ends of pipes made of thermoplastic material comprising the steps of:
    providing a heating station for heating a plurality of portions of ends of pipes made of thermoplastic material, comprising:
        a plurality of heating elements including short wave radiation units,
        a plurality of housings alongside each other and lying aligned on a horizontal plane, each housing of the plurality of housings shaped to accommodate a respective pipe and comprising at least one external heating element and at least one internal heating element, wherein the plurality of housings are grouped together in a plurality of cells, with each cell of the plurality of cells comprising at most two of the plurality of housings and at least two groups of external heating elements, each group of the at least two groups comprising at least one heating element, the at least two groups being spaced at least partly offset along a predetermined direction parallel to a central axis of the respective pipe being heated in the cell;

wherein each of the short wave radiation units has a relative operating zone extending longitudinally along the predetermined direction, and wherein each of the plurality of housings includes a cylindrical screening surface extending coaxially to the respective pipe being heated for a predetermined stretch, the cylindrical screening surface including an edge defining an extension of an end portion of the respective pipe being heated, wherein the relative operating zone of a first group of the at least two groups extends longitudinally along the predetermined direction from a first limit within the predetermined stretch to a second limit such that a center line of the relative operating zone falls in a portion of pipe to be heated; wherein the relative operating zone of a second group of the at least two groups extends from a third limit within a first half of the relative operating zone of the first group to a fourth limit outside an end of the portion of pipe to be heated and which passes beyond, away from the respective pipe, the second limit;

preparing a plurality of pipes made of thermoplastic material, the plurality of pipes including a number of pipes greater than two, feeding the plurality of pipes to the heating station, heating longitudinal ends of the plurality of pipes in the heating station, from a first predetermined temperature at which longitudinal ends are at an end of a step for feeding the plurality of pipes, to a second predetermined deformation temperature at which the plurality of pipes are subjected to forming, forming into bells the heated longitudinal ends of the plurality of pipes.

10. A station for heating a plurality of portions of ends of pipes made of thermoplastic material, comprising:

a plurality of heating elements including short wave radiation units, a plurality of housings alongside each other and lying aligned on a horizontal plane, each housing of the plurality of housings shaped to accommodate a respective pipe and comprising at least one external heating element and at least one internal heating element, wherein the plurality of housings are grouped together in a plurality of cells, with each cell of the plurality of cells comprising at most two of the plurality of housings and at least two groups of external heating elements, each group of the at least two groups comprising at least one heating element, the at least two groups being spaced at least partly offset along a predetermined direction parallel to a central axis of the respective pipe being heated in the cell;

wherein each cell comprises a reflective surface arranged to face the respective pipe for at least half an angular extension of an outer cylindrical surface of the respective pipe;

wherein the reflective surface includes a curved extension with a curvature corresponding to a curvature of the outer cylindrical surface.

11. The station according to claim 10, wherein each cell includes an upper zone and a lower zone on opposite sides of the horizontal plane, wherein the at least one external heating element is located in one of the upper and lower zones and the curved extension is positioned at the other of the upper and lower zones.

12. The station according to claim 11, wherein the curved extension is positioned at the lower zone.

13. The station according to claim 10, wherein each cell includes two lateral reflective walls positioned symmetrically on opposite sides of a median plane of each cell, wherein the curved extension is connected to the two lateral walls.

14. The station according to claim 10, wherein the short wave radiation units of the at least one external heating element of each cell are positioned symmetrically relative to a median plane of each cell perpendicular to the horizontal plane and parallel to the central axis of the respective pipe being heated in each cell.

15. A belling machine for multi-belling of pipes made of thermoplastic material, to simultaneously form bells on respective ends of a plurality of tubes, comprising:

a line for feeding pipes on which bells are to be formed, a heating station according to claim 10 for simultaneously heating a plurality of the pipes, a forming station for forming bells on the ends of the pipes, the forming station comprising a plurality of forming spindles.

* * * * *